United States Patent
Ryu et al.

(10) Patent No.: US 10,560,673 B2
(45) Date of Patent: Feb. 11, 2020

(54) METHOD AND APPARATUS FOR RECOVERING IMAGE

(71) Applicants: Samsung Electronics Co., Ltd., Suwon-si (KR); Industry-Academic Cooperation Foundation, Yonsei University, Seoul (KR)

(72) Inventors: Inhwan Ryu, Suwon-si (KR); Moon Gi Kang, Seoul (KR); KeeChang Lee, Seongnam-si (KR); Seung Hoon Jee, Seoul (KR); Min Sub Kim, Seoul (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 0 days.

(21) Appl. No.: 16/161,229

(22) Filed: Oct. 16, 2018

(65) Prior Publication Data

US 2019/0394437 A1 Dec. 26, 2019

(30) Foreign Application Priority Data

Jun. 20, 2018 (KR) .......................... 10-2018-0070984

(51) Int. Cl.
*H04N 9/64* (2006.01)
*H04N 9/78* (2006.01)
(52) U.S. Cl.
CPC ............... *H04N 9/646* (2013.01); *H04N 9/78* (2013.01)
(58) Field of Classification Search
CPC ................................. H04N 9/646; H04N 9/78

USPC ......................................................... 348/624
See application file for complete search history.

(56) References Cited

U.S. PATENT DOCUMENTS

| | | | | |
|---|---|---|---|---|
| 5,077,603 A | * | 12/1991 | Macovski | ............... H04N 9/646 348/631 |
| 5,081,302 A | * | 1/1992 | Bayer | ................... C07C 209/68 564/409 |
| 5,631,480 A | * | 5/1997 | Tseng | ................ H01L 27/10808 257/309 |
| 8,131,072 B2 | | 3/2012 | Jerdev | |
| 8,867,830 B2 | | 10/2014 | Joensson | |
| 9,232,203 B2 | | 1/2016 | Sawada | |
| 2006/0092174 A1 | | 5/2006 | Lin | |

(Continued)

FOREIGN PATENT DOCUMENTS

| | | |
|---|---|---|
| JP | 2009-268011 A | 11/2009 |
| JP | 2010-193112 A | 9/2010 |

(Continued)

OTHER PUBLICATIONS

Rouf, Mushfiqur et al., "Gradient Domain Color Restoration of Clipped Highlights", *2012 IEEE Computer Society Conference on Computer Vision and Pattern Recognition Workshops*, 2012 (pp. 1-8).

*Primary Examiner* — Michael Lee
(74) *Attorney, Agent, or Firm* — NSIP Law (57) ABSTRACT

An image recovery apparatus and method are provided, where the image recovery apparatus calculates a reference color image based on a linear correlation between a color channel image and a luminance channel image, and corrects the luminance channel image based on residual information that indicates a difference between the reference color image and the color channel image, to recover an image.

17 Claims, 8 Drawing Sheets

(56) References Cited

U.S. PATENT DOCUMENTS

| | | | |
|---|---|---|---|
| 2006/0146193 A1 | 7/2006 | Weerasinghe et al. | |
| 2007/0103596 A1 | 5/2007 | Hsu | |
| 2008/0181491 A1* | 7/2008 | Bala | H04N 1/40012 |
| | | | 382/162 |
| 2015/0373314 A1* | 12/2015 | Zhu | H04N 1/62 |
| | | | 348/648 |

FOREIGN PATENT DOCUMENTS

| | | |
|---|---|---|
| JP | 5106870 B2 | 12/2012 |
| JP | 5169540 B2 | 3/2013 |
| JP | 5347707 B2 | 11/2013 |
| JP | 5803233 B2 | 11/2015 |
| KR | 10-0405150 B1 | 11/2003 |

* cited by examiner

METHOD AND APPARATUS FOR RECOVERING IMAGE

CROSS-REFERENCE TO RELATED APPLICATIONS

This application claims the benefit under 35 USC § 119(a) of Korean Patent Application No. 10-2018-0070984, filed on Jun. 20, 2018, in the Korean Intellectual Property Office, the entire disclosure of which is incorporated herein by reference for all purposes.

BACKGROUND

1. Field

The following description relates to a technology of recovering an image.

2. Description of Related Art

When an image sensor has a narrow dynamic range, a color digital image acquired by the image sensor may not accurately express an actual color of a target object. When extremely bright light is incident through a lens of the image sensor, the original color of the target object is not correctly expressed in an image. When an intensity of light with a wavelength that exceeds a maximum value is detected by each pixel of the image sensor, a color value of a corresponding pixel is clipped to a maximum color value. Also, neighboring pixels affected by the pixel with the color value clipped to the maximum color value lose their original colors and have color values close to the maximum color value. A pixel with the maximum color value or a color value close to the maximum color value is referred to as a "saturated pixel." Thus, a saturated pixel, i.e., a pixel with a distorted color value needs to be fixed to accurately express the original color value of the saturated pixel.

SUMMARY

This Summary is provided to introduce a selection of concepts in a simplified form that are further described below in the Detailed Description. This Summary is not intended to identify key features or essential features of the claimed target object matter, nor is it intended to be used as an aid in determining the scope of the claimed target object matter.

In one general aspect, there is provided an image recovery method including generating a reference color image from a luminance channel image based on linear correlation information indicating a linear correlation between a color channel image and the luminance channel image, calculating residual information based on the reference color image and the color channel image, and correcting the luminance channel image based on the residual information.

The image recovery method may include acquiring an input image, and determining the color channel image from the input image.

The determining of the color channel image may include determining an image patch comprising pixels corresponding to a partial area of the input image as the color channel image.

The determining of the color channel image may include selecting a blue channel image as the color channel image from the input image.

The image recovery method may include compressing pixel values of the luminance channel image to a maximum value of a display.

The generating of the reference color image may include generating a target color image by filtering the color channel image based on a difference in position between pixels in the luminance channel image and a difference between pixel values of the pixels in the luminance channel image.

The generating of the reference color image may include determining a first linear correlation coefficient based on a covariance between the color channel image and the luminance channel image and a variance of the luminance channel image, determining a second linear correlation coefficient based on the first linear correlation coefficient, an expected value of the color channel image, and an expected value of the luminance channel image, and generating the reference color image by applying the first linear correlation coefficient and the second linear correlation coefficient to the luminance channel image.

The image recovery method may include calculating illuminance information based on a low frequency component of the luminance channel image.

The correcting of the luminance channel image may include correcting the luminance channel image based on the calculated illuminance information and the residual information.

The calculating of the illuminance information may include generating a target luminance image by filtering the luminance channel image based on a difference in position between pixels in the luminance channel image and a difference between pixel values of the pixels in the luminance channel image, and determining the target luminance image as the illuminance information.

The calculating of the residual information may include removing an intensity value of a pixel in the reference color image that corresponds to a pixel in the color channel image from an intensity value of the pixel in the color channel image.

In another general aspect, there is provided an image recovery apparatus including an image acquirer configured to acquire a color channel image, and a processor configured to generate a reference color image from a luminance channel image based on linear correlation information indicating a linear correlation between a color channel image and the luminance channel image, to calculate residual information based on the reference color image and the color channel image, and to correct the luminance channel image based on the residual information.

The image acquirer may be configured to acquire an input image, and the processor may be configured to determine the color channel image from the input image.

The processor may be configured to determine an image patch comprising pixels corresponding to a partial area of the input image as the color channel image.

The processor may be configured to select a blue channel image as the color channel image from the input image.

The processor may be configured to compress pixel values of the luminance channel image to a maximum value of a display.

The processor may be configured to generate a target color image by filtering the color channel image based on a difference in position between pixels in the luminance channel image and a difference between pixel values of the pixels in the luminance channel image.

The processor may be configured to determine a first linear correlation coefficient based on a covariance between the color channel image and the luminance channel image and a variance of the luminance channel image, determine a second linear correlation coefficient based on the first linear correlation coefficient, an expected value of the color channel image and an expected value of the luminance channel image, and generate the reference color image by applying the first linear correlation coefficient and the second linear correlation coefficient to the luminance channel image.

The processor may be configured to calculate illuminance information based on a low frequency component of the luminance channel image.

The processor may be configured to correct the luminance channel image based on the calculated illuminance information and the residual information.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions of examples disclosed in the present disclosure are merely intended for the purpose of describing the examples and the examples may be implemented in various forms. The examples are not meant to be limited, but it is intended that various modifications, equivalents, and alternatives are also covered within the scope of the claims.

Regarding the reference numerals assigned to the elements in the drawings, it should be noted that the same elements will be designated by the same reference numerals, wherever possible, even though they are shown in different drawings. Also, in describing of example embodiments, detailed description of well-known related structures or functions will be omitted when it is deemed that such description will cause ambiguous interpretation of the present disclosure.

Figure 1:
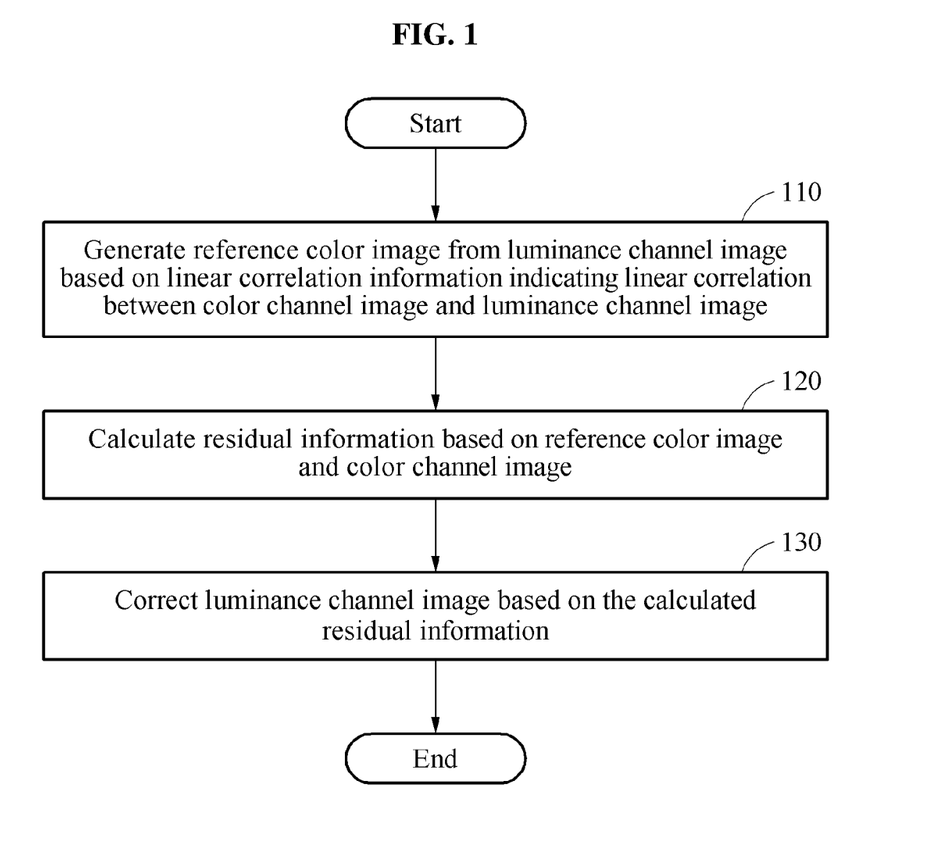
FIG. 1 is a diagram illustrating an example of an image recovery method.

FIG. 1 is a diagram illustrating an example of an image recovery method. The operations in FIG. 1 may be performed in the sequence and manner as shown, although the order of some operations may be changed or some of the operations omitted without departing from the spirit and scope of the illustrative examples described. Many of the operations shown in FIG. 1 may be performed in parallel or concurrently. One or more blocks of FIG. 1, and combinations of the blocks, can be implemented by special purpose hardware-based computer that perform the specified functions, or combinations of special purpose hardware and computer instructions.

Referring to FIG. 1, in operation 110, an image recovery apparatus generates a reference color image from a luminance channel image based on linear correlation information that indicates a linear correlation between a color channel image and the luminance channel image.

In an example, the color channel image includes pixels with an intensity value corresponding to one arbitrary color. An input image includes a plurality of color channel images. For example, the input image includes a red channel image, a green channel image, and a blue channel image. The red channel image represents an intensity at which light in a wavelength band corresponding to red is received. The green channel image represents an intensity at which light in a wavelength band corresponding to green is received. The blue channel image represents an intensity at which light in a wavelength band corresponding to blue is received. However, an example in which the input image is in an RGB color space is described, and channels are not limited thereto. For example, the input image may be a CMYK (cyan, magenta, yellow, and key) color space or an HSV (Hue, Saturation, Value) color space, and may include channel images corresponding to a CMYK color space or an HSV color space.

The luminance channel image includes pixels with an intensity value representing a luminance. For example, the luminance channel image is an image corresponding to a Y channel in a YUV color space.

In an example, the linear correlation represents a local linearity between an intensity value of pixels included in the color channel image and an intensity value of pixels included in the luminance channel image. The linear correlation information is information calculated based on the linear correlation between the color channel image and the luminance channel image, and includes, for example, information to linearly transform an intensity value of the luminance channel image to be similar to an intensity distribution characteristic of the color channel image. The linear correlation and the linear correlation information will be further described below with reference to FIG. 4.

A maximum intensity of light that may be received by an image sensor is limited. For example, an intensity value of a pixel included in an image acquired by the image sensor is limited to a maximum value (for example, "255"). A pixel with the maximum value is referred to as a "saturated pixel". A pixel with an intensity value less than the maximum value is referred to as an "unsaturated pixel." The luminance channel image represents a luminance, and accordingly the luminance channel image includes a larger number of saturated pixels than that of the color channel image.

The reference color image is an image generated from the luminance channel image based on the linear correlation information. For example, the reference color image is an image generated by converting the luminance channel image so that the luminance channel image has a linearity of the color channel image.

In operation 120, the image recovery apparatus calculates residual information based on the reference color image and the color channel image. In an example, the residual information indicates a difference between the color channel image and the reference color image. For example, the image recovery apparatus subtracts an intensity value of a pixel that is included in the reference color image and that corresponds to a pixel included in the color channel image, from an intensity value of the pixel in the color channel image, and calculates the residual information. The residual information includes saturated area information that is present in the color channel image but is absent in the luminance channel image. The residual information will be further described below with reference to FIGS. 5 and 6.

In operation 130, the image recovery apparatus corrects the luminance channel image based on the calculated residual information. For example, the image recovery apparatus adds the residual information to the luminance channel image, and corrects the luminance channel image. The luminance channel image corrected by applying the residual information is referred to as an "output luminance image."

Figure 2:
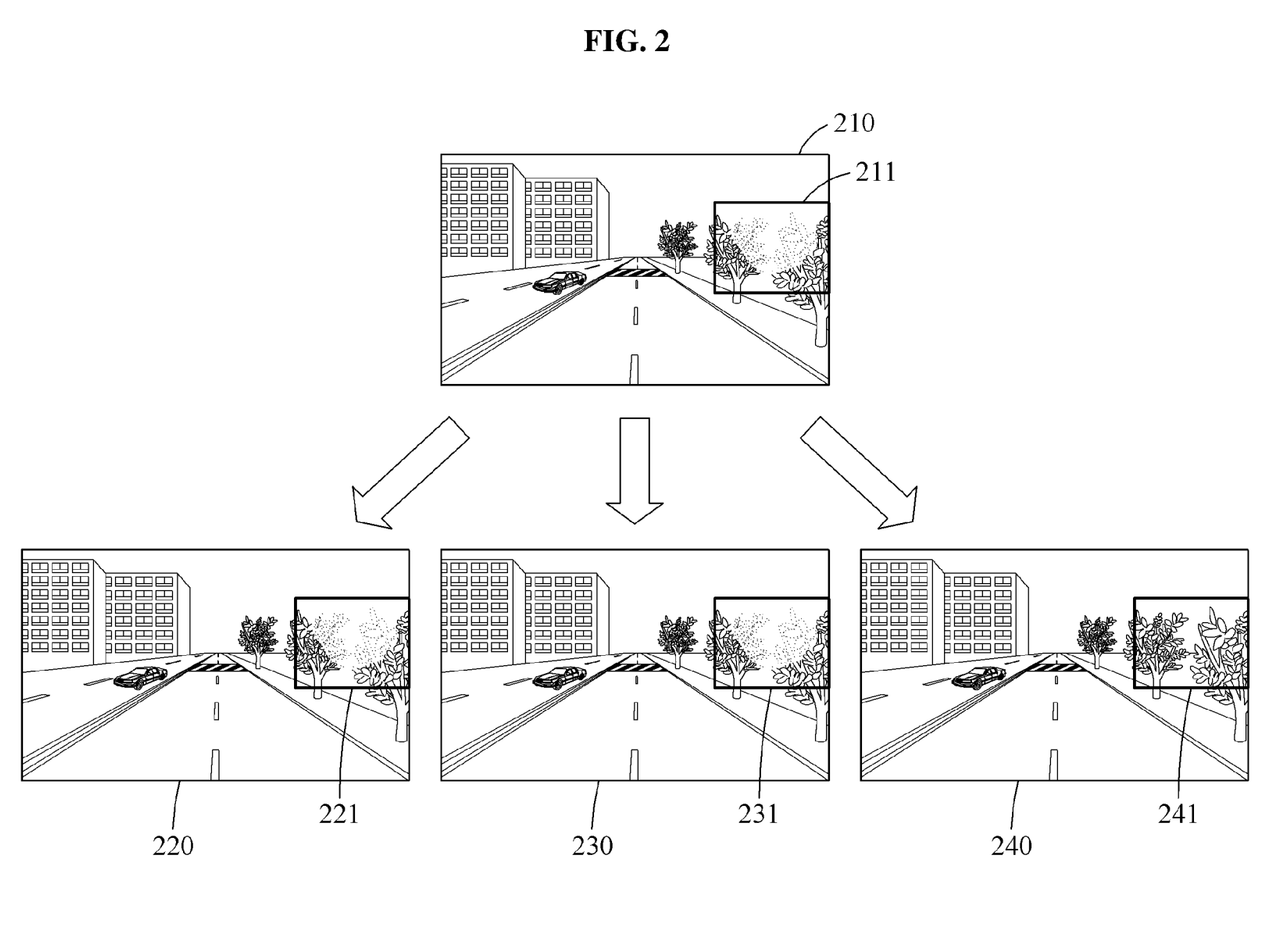
FIG. 2 illustrates an example of color channel images.

FIG. 2 illustrates an example of color channel images.

An image recovery apparatus acquires an input image 210. For example, the image recovery apparatus includes an image sensor, and the image sensor generates the input image 210 by photographing. However, examples are not limited thereto, and the image recovery apparatus may receive the input image 210 via a wire or wirelessly using a communicator. Also, the image recovery apparatus loads the input image 210 stored in a memory and acquires the input image 210.

As described above, in an image acquisition, a saturation phenomenon occurs when light exceeding a limit to be accepted as a digital signal is received. In an example of a strong contrast, a saturation occurs in a relatively bright area of an image. Also, due to an excessive exposure, a saturation occurs. For example, when light exceeding a maximum value that may be sensed is received, an intensity value of a corresponding pixel is limited to the maximum value. When a number of saturated pixels increases, details of an object and a background in an image may be lost.

The image recovery apparatus receives light for each wavelength band of light that may be received to each color channel, and acquires a color image as the input image 210. Based on a characteristic of a target object (for example, a color of the target object), the image recovery apparatus receives light of different energy amounts for each color channel. Whether a saturation phenomenon occurs is determined based on each color channel, and a number of saturated pixels may vary for each color channel. Also, a difference in sensitivity for each channel occurs based on, for example, a characteristic of a light source, a characteristic of an environment, and a color temperature of light received by the image recovery apparatus.

For example, a saturation does not occur in any one or any combination of a red channel image 220, a green channel image 230 and a blue channel image 240 of the input image 210, or a small number of saturated pixels is provided. Also, the red channel image 220, the green channel image 230 and the blue channel image 240 have saturated pixels in different areas.

FIG. 2 illustrates the input image 210, and the red channel image 220, the green channel image 230 and the blue channel image 240 that constitute the input image 210. The image recovery apparatus determines an image patch including pixels corresponding to at least a partial area 211 of the input image 210 as a color channel image. For example, the input image 210 of FIG. 2 shows that details of a background in the partial area 211 disappear.

For example, a luminance channel image includes the red channel image 220, the green channel image 230 and the blue channel image 240 at a ratio of 3:6:1. Thus, the green channel image 230 has a highest correlation with the luminance channel image, and the red channel image 220 has a second highest correlation with the luminance channel image. The blue channel image 240 has a lowest correlation with the luminance channel image.

For example, as shown in FIG. 2, in a partial area 221 of the red channel image 220 and a partial area 231 of the green channel image 230, details of an image are lost due to saturated pixels. Also, a partial area 241 of the blue channel image 240 has a small number of saturated pixels or does not have a saturated pixel, and accordingly details of the partial area 241 of the blue channel image 240 are preserved.

FIGS. 3 through 6 illustrate an example of an estimation of a linear connection and a generation of an output luminance image based on the linear connection.

Figure 3:
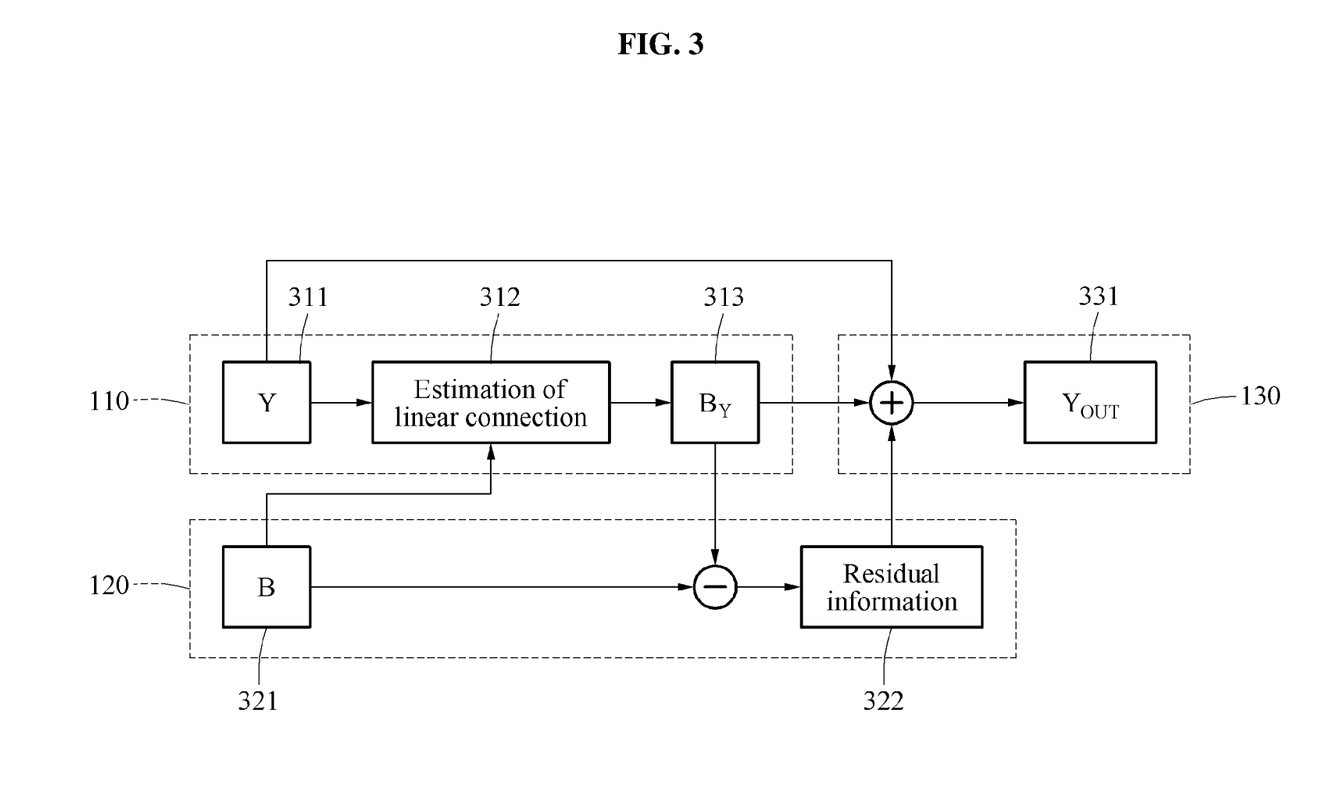
FIGS. 3 through 6 illustrate examples of an estimation of a linear connection and a generation of an output luminance image based on the linear connection.
Figure 4:
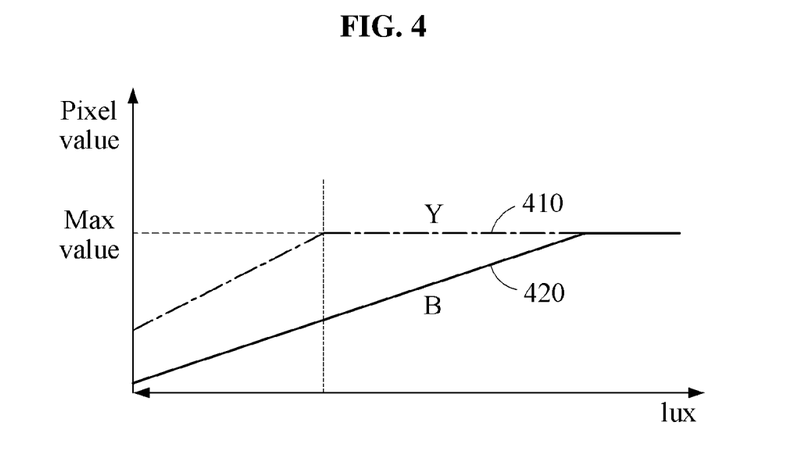
Figure 5:
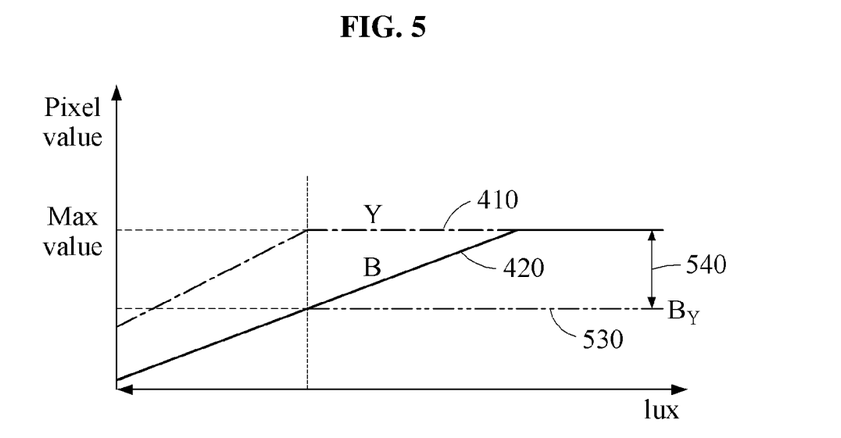
Figure 6:
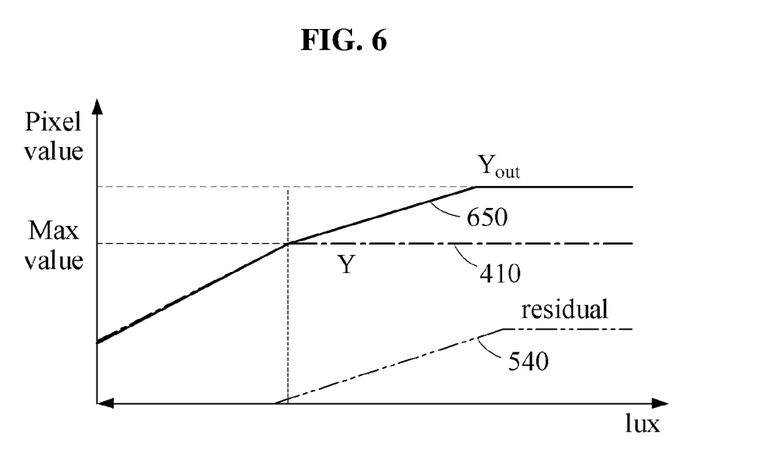

FIG. 3 illustrates an example of a process of recovering a luminance channel image based on a linearity of an unsaturated color channel image in an image recovery apparatus. FIGS. 4 through 6 illustrate pixel values (for example, an intensity value) of a luminance channel image, a color channel image, a reference color image, residual information 322 and an output luminance image with respect to an actual luminance. In FIGS. 4 through 6, an x axis represents the actual luminance, and a y axis represents a pixel value output from an image sensor with respect to a corresponding actual luminance. Accordingly, graphs of FIGS. 4 through 6 correspond to sensing characteristics of an image sensor. The graphs of FIGS. 4 through 6 is independent of a distribution of intensity values of pixels included in each image.

For convenience of description, an example in which a color channel image is a blue channel image will be described below, however, examples are not limited thereto.

Referring to FIG. 3, in operation 110, the image recovery apparatus acquires a luminance channel image Y 311. In operation 312, the image recovery apparatus estimates a linear connection between the luminance channel image Y 311 and a blue channel image B 321. The linear connection is also referred to as a "linear correlation."

For example, referring to FIG. 4, a pixel value 410 of the luminance channel image Y 311 linearly increases up to a maximum value with respect to an actual luminance. The pixel value 410 of the luminance channel image Y 311 has a saturated value (for example, a maximum value of "255") for an actual luminance that exceeds a threshold. Also, a pixel value 420 of the blue channel image B 321 linearly increases up to the maximum value with respect to the actual luminance. The pixel value 420 of the blue channel image B 321 has a saturated value for an actual luminance that exceeds the threshold. Accordingly, the luminance channel image Y 311 and the blue channel image B 321 locally have linearity. Also, because the luminance channel image Y 311 and the blue channel image B 321 have intensity values that are linearly proportional to each other up to an actual luminance that is less than or equal to the threshold, the luminance channel image Y 311 and the blue channel image B 321 locally have a linear correlation.

The image recovery apparatus estimates linear correlation information indicating the above linear correlation. The linear correlation information includes a first linear correlation coefficient used to adjust a slope of the luminance channel image Y 311, and a second linear correlation coefficient used to adjust an offset of the luminance channel image Y 311. An example of calculating the first linear correlation coefficient and the second linear correlation coefficient will be described below with reference to FIG. 7.

The image recovery apparatus generates a reference color image By 313 by applying the linear correlation information to the luminance channel image Y 311. The image recovery apparatus adjusts the slope of the luminance channel image Y 311 by applying the first linear correlation coefficient to the luminance channel image Y 311, and adjusts the offset of the luminance channel image Y 311 by applying the second linear correlation coefficient. For example, the luminance channel image Y 311 is linearly transformed to have the same linearity (for example, the same slope and intercept) as that of the blue channel image B 321 up to the actual luminance that is less than or equal to the threshold. As described above, the luminance channel image Y 311 transformed to have the same linearity as that of the blue channel image B 321 is referred to as the reference color image By 313.

As shown in FIG. 5, a pixel value 530 of the reference color image By 313 has the same slope and the same offset as those of the blue channel image B 321 in an unsaturated area with respect to an actual luminance. In an area in which the pixel value 410 of the luminance channel image Y 311 is saturated, the pixel value 410 has the maximum value. However, the pixel value 530 of the reference color image By 313 is less than the maximum value. The pixel value 530 of the reference color image By 313 is a value reduced from the pixel value 420 of the blue channel image B 321 through a linear transformation. In an area in which an existing luminance image Y is saturated, the pixel value 530 of the reference color image By 313 is less than the pixel value 420 of the blue channel image B 321.

Referring back to FIG. 3, in operation 120, the image recovery apparatus calculates the residual information 322 based on the reference color image By 313 and a color channel image (for example, the blue channel image B 321). For example, the image recovery apparatus subtracts the reference color image By 313 from the blue channel image B 321, and calculates the residual information 322.

As shown in FIG. 5, the residual information 322 indicates a residual 540 that is a difference between the pixel value 420 of the blue channel image B 321 and the pixel value 530 of the reference color image By 313.

In operation 130, the image recovery apparatus corrects the luminance channel image Y 311 based on the calculated residual information 322. The image recovery apparatus corrects the luminance channel image Y 311 and generates an output luminance image $Y_{out}$ 331.

For example, as shown in FIG. 6, the image recovery apparatus adds the residual 540 to the pixel value 410 of the luminance channel image Y 311, to determine a pixel value 650 of the output luminance image $Y_{out}$ 331. However, a calculation of the output luminance image $Y_{out}$ 331 is not limited thereto, and the image recovery apparatus calculates the output luminance image $Y_{out}$ 331, further based on illuminance information. An example of the illuminance information will be described below with reference to FIG. 7.

Figure 7:
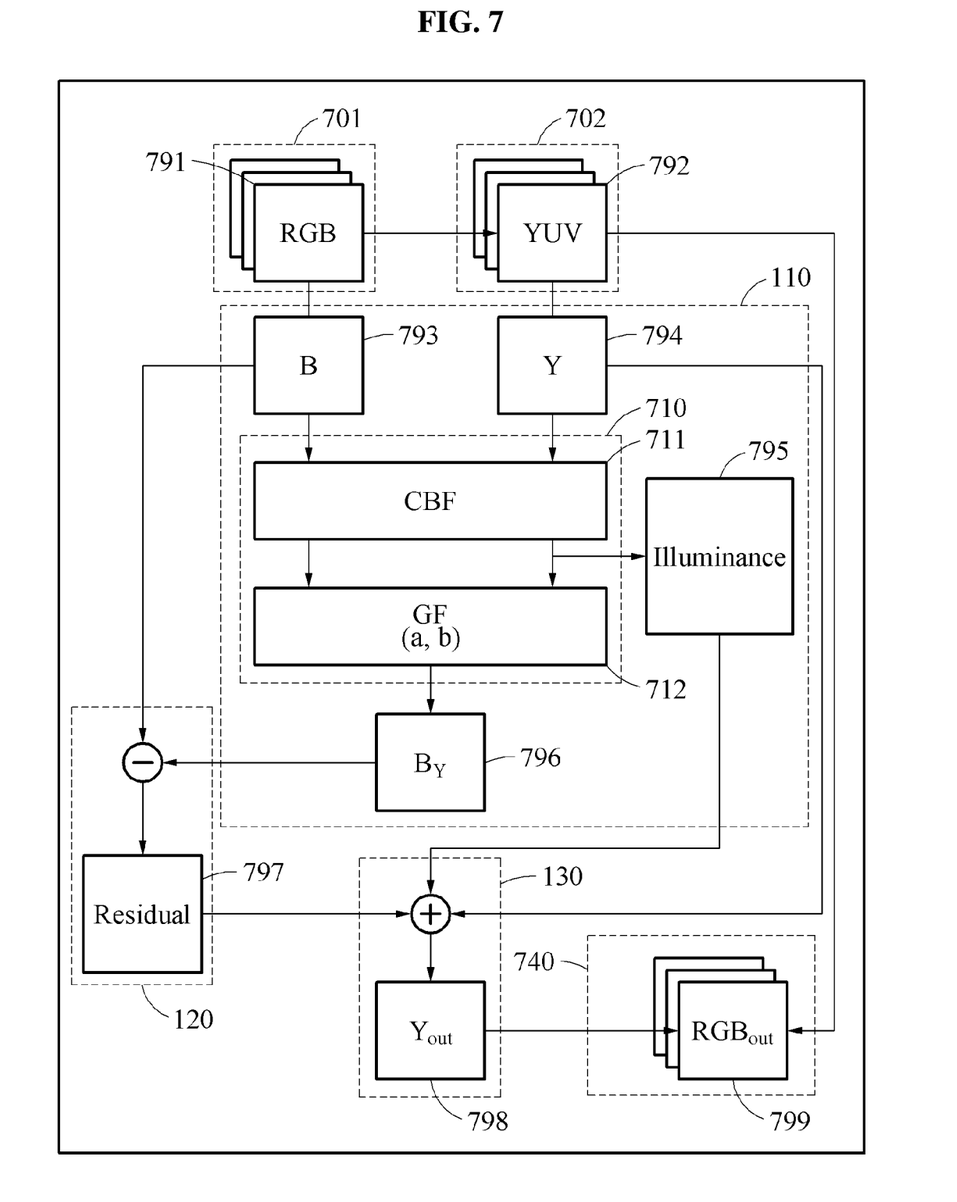
FIG. 7 illustrates an example of an image recovery process.

FIG. 7 illustrates an example of an image recovery process. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently. One or more blocks of FIG. 7, and combinations of the blocks, can be implemented by special purpose hardware-based computer that perform the specified functions, or combinations of special purpose hardware and computer instructions. In addition to the description of FIG. 7 below, the descriptions of FIGS. 1-6 are also applicable to FIG. 7, and are incorporated herein by reference. Thus, the above description may not be repeated here.

Referring to FIG. 7, in operation 701, an image recovery apparatus acquires an input image 791. The image recovery apparatus selects a color channel image 793 from the input image 791. For example, the image recovery apparatus selects a blue channel image as the color channel image 793 from the input image 791. For convenience of description in FIG. 7, the input image 791 is an example of a color image based on an RGB color space, however, examples are not limited thereto.

In operation 702, the image recovery apparatus acquires a conversion image 792. The image recovery apparatus performs a domain conversion of the input image 791, and acquires the conversion image 792. For example, the image recovery apparatus generates the conversion image 792 including a luminance channel image 794 from the input image 791 including the color channel image 793. The conversion image 792 is an image based on a YUV color space, and includes the luminance channel image 794 (for example, corresponding to a Y channel), a first chrominance image (for example, corresponding to a U channel), and a second chrominance image (for example, corresponding to a V channel). However, a color space of the conversion image 792 is not limited thereto.

As described above, by separating luminance and color through the domain conversion, the image recovery apparatus recovers information associated with saturated pixels shown in a luminance channel, and maintains a color constancy independently of the luminance information.

In operation 110, the image recovery apparatus generates a reference color image 796 from the luminance channel image 794 based on linear correlation information. For example, in operation 710, the image recovery apparatus estimates linear correlation information between the color channel image 793 and the luminance channel image 794, applies the linear correlation information to the luminance channel image 794, and generates the reference color image 796.

For example, to estimate the linear correlation information between the color channel image 793 and the luminance channel image 794, the image recovery apparatus selects, as a population, pixels having intensity values corresponding to a linear area (for example, an unsaturated area) from the color channel image 793 and the luminance channel image 794. The image recovery apparatus applies a cross bilateral filter (CBF) 711 to the color channel image 793 and the luminance channel image 794, and determines a population to estimate the linear correlation information. Accordingly, the image recovery apparatus selects similar populations based on a luminance. For example, the CBF 711 is expressed as shown in Equation 1 below.

$$CBF[I]_p = \eta \sum_{G \in \omega_k} G_{\sigma_z}(\|p - q\|) \cdot G_{\sigma_r}(\|I_p - I_q\|) \cdot I_q \quad \text{[Equation 1]}$$

In Equation 1, $\omega_k$ denotes an image patch that is a partial area in an image. Also, p denotes a position of a target pixel, and q denotes a position of a pixel whose correlation is to be determined. $G_{\sigma_z}$ denotes a normal distribution function (for example, a normalized Gaussian function), and $\sigma_s$ denotes a variance. $G_{94_r}$ denotes a normal distribution function (for example, a normalized Gaussian function), and $\sigma_r$ denotes a variance. $\eta$ denotes a normalization constant determined so that a summation result of Equation 1 is "1". $\|p-q\|$ denotes a magnitude of a vector, that is, a distance between the positions p and q within the image patch. $I_p$ denotes an intensity value at the position p and $I_q$ denotes an intensity value at the position q. $\|I_p-I_q\|$ denotes a difference between the intensity value at the position p and the intensity value at the position q. $CBR[I]_p$ denotes a value of a CBF with respect to an intensity value of a pixel at the position p.

In an example, the image recovery apparatus calculates illuminance information 795 based on a low frequency component of the luminance channel image 794. In an example, to calculate the illuminance information 795, the image recovery apparatus applies the CBF 711 to the luminance channel image 794. The CBF 711 is an example of a Gaussian low-pass filter, and is a filter reflecting a distance from a central pixel of a kernel and a difference between pixel values. For example, the CBF 711 excludes a contribution to a population by assigning a small weight to pixels having a great difference between pixel values. The CBF 711 passes, for example, a low frequency component. When Equation 1 is applied to the luminance channel image 794, Equation 2 is obtained as shown below.

$$CBF[Y]_p = \eta \sum_{G \in \omega_k} G_{\sigma_z}(\|p - q\|) \cdot G_{\sigma_r}(\|Y_p - Y_q\|) \cdot Y_q \quad \text{[Equation 2]}$$

In Equation 2, $Y_p$ denotes an intensity value at a position p in the luminance channel image 794, and $Y_q$ denotes an intensity value at a position q in the luminance channel image 794. $CBF[Y]_p$ denotes a CBF value with respect to the intensity value at the position p in the luminance channel image 794. The other variables are the same as those in Equation 1 described above.

In an example, the image recovery apparatus filters the luminance channel image 794 based on a difference in a position between pixels in the luminance channel image 794 and a difference between pixel values of the pixels in the luminance channel image 794, and generates a target luminance image. For example, the image recovery apparatus generates a target luminance image by applying a CBF coefficient calculated for the luminance channel image 794 based on Equation 2 to the luminance channel image 794 as shown in Equation 3 below.

$$Y' = \sum_{p \in \omega_k} CBF[Y]_p * Y_p \quad \text{[Equation 3]}$$

In Equation 3, Y' denotes a target luminance image, and * denotes a convolution operation. For example, the image recovery apparatus determines the target luminance image to be the illuminance information 795. In this example, the image recovery apparatus determines information indicating that a range of intensity values of the target luminance image is adjusted from "0" to "1" to be the illuminance information 795. Also, the target luminance image is used as a population for an estimation of linear correlation information, which will be described below.

In another example, the image recovery apparatus filters the color channel image 793 based on the difference in the position between the pixels in the luminance channel image 794 and the difference between the pixel values of the pixels in the luminance channel image 794, and generates a target color image. The target color image is used as a population for an estimation of linear correlation information, which will be described below.

For example, when the color channel image 793 and the target color image are associated with a blue channel, Equation 4 is represented as shown below.

$$B' = \sum_{p \in \omega_k} CBF[Y]_p * B_p \quad \text{[Equation 4]}$$

In Equation 4, B' denotes the target color image, and $B_p$ denotes an intensity value at a position p in a blue channel image. However, examples are not limited to the blue channel image, and the CBF 711 is similarly applicable to another channel image.

The image recovery apparatus estimates linear correlation information indicating a linear correlation between a luminance channel and a color channel (for example, a blue channel) from the target luminance image and the target color image, using a guided filter (GF) 712. For example, an error function for a linearity between the target luminance image and the target color image is represented as shown in Equation 5 below.

$$f(a, b) = \sum_{\omega_k} (aY' + b - B')^2 + \epsilon a^2 \quad \text{[Equation 5]}$$

In Equation 5, f(a, b) denotes the error function, Y' denotes a pixel value corresponding to the target luminance image, and B' denotes a pixel value corresponding to the target color image. Also, a denotes a first linear correlation coefficient, and b denotes a second linear correlation coefficient. $\epsilon$ denotes a constant.

The image recovery apparatus calculates the first linear correlation coefficient a and the second linear correlation coefficient b so that the error function of Equation 5 is minimized. For example, the image recovery apparatus determines the first linear correlation coefficient a and the second linear correlation coefficient b using Equations 6 and 7 as shown below.

$$a = \frac{\text{Cov}(B', Y')}{\text{Var}(Y') + \epsilon} \quad \text{[Equation 6]}$$

$$b = E(B') - aE(Y') \quad \text{[Equation 7]}$$

In Equation 6, Cov(B', Y') denotes a covariance between an intensity value of the target color image and an intensity value of the target luminance image, and Var(Y') denotes a variance of the intensity value of the target luminance image. ϵ denotes a constant. In Equation 7, E(B') denotes an expected value of the intensity value of the target color image, and indicates, for example, an average value. E(Y') denotes an expected value of the intensity value of the target luminance image, and indicates, for example, an average value. Although Equations 5 through 7 have been described based on the target color image and the target luminance image, examples are not limited thereto. Equations 5 through 7 may also be calculated from the color channel image 793 and the luminance channel image 794.

For example, the image recovery apparatus determines a first linear correlation coefficient based on a covariance between the color channel image 793 and the luminance channel image 794 and a variance of the luminance channel image 794. The image recovery apparatus determines a second linear correlation coefficient based on the first linear correlation coefficient, an expected value of the color channel image 793, and an expected value of the luminance channel image 794.

The image recovery apparatus applies the first linear correlation coefficient a and the second linear correlation coefficient b to the luminance channel image 794, and generates the reference color image 796, as shown in Equation 8 below.

$$B_Y = aY + b. \quad \text{[Equation 8]}$$

In Equation 8, $B_Y$ denotes the reference color image 796 of a blue channel. The image recovery apparatus generates the reference color image 796 based on Equation 8.

In operation 120, the image recovery apparatus calculates residual information 797. For example, the image recovery apparatus subtracts the reference color image 796 from the color channel image 793, and calculates the residual information 797. The residual information 797 has characteristics of a target object in all bands, and accordingly the image recovery apparatus accurately compensates for an area that is lost due to a saturation in a luminance channel.

In operation 130, the image recovery apparatus generates an output luminance image 798. For example, the image recovery apparatus corrects the luminance channel image 794 based on the calculated illuminance information 795 and the calculated residual information 797. For example, the image recovery apparatus generates the output luminance image 798 as shown in Equation 9 below.

$$Y_{out} = \text{illuminance} \cdot \text{residual} + Y \quad \text{[Equation 9]}$$

In Equation 9, illuminance denotes the illuminance information 795 calculated in Equation 3, and residual denotes the residual information 797 calculated in operation 120. $Y_{out}$ denotes the output luminance image 798.

In operation 740, the image recovery apparatus determines an output image 799 based on the corrected luminance channel image 794 and remaining channel images of the conversion image 792. For example, the image recovery apparatus performs a conversion to another color space (for example, an RGB color space) from the output luminance image 798 generated in operation 130 and acquired chrominance images (for example, corresponding to a U channel and a V channel), to generate an output image 799, for example, $RGB_{out}$.

Although FIG. 7 illustrates an example of using the blue channel image in the input image 791, examples are not limited thereto. In an example, the image recovery apparatus calculates residual information 797 for each of a red channel image and a green channel image, and generates an output luminance image 798 by reflecting the residual information 797 to the luminance channel image 794. Also, the image recovery apparatus calculates residual information 797 for each of a red channel, a green channel and a blue channel, applies a sum of the calculated residual information 797 to the luminance channel image 794, and generates an output luminance image 798.

Figure 8:
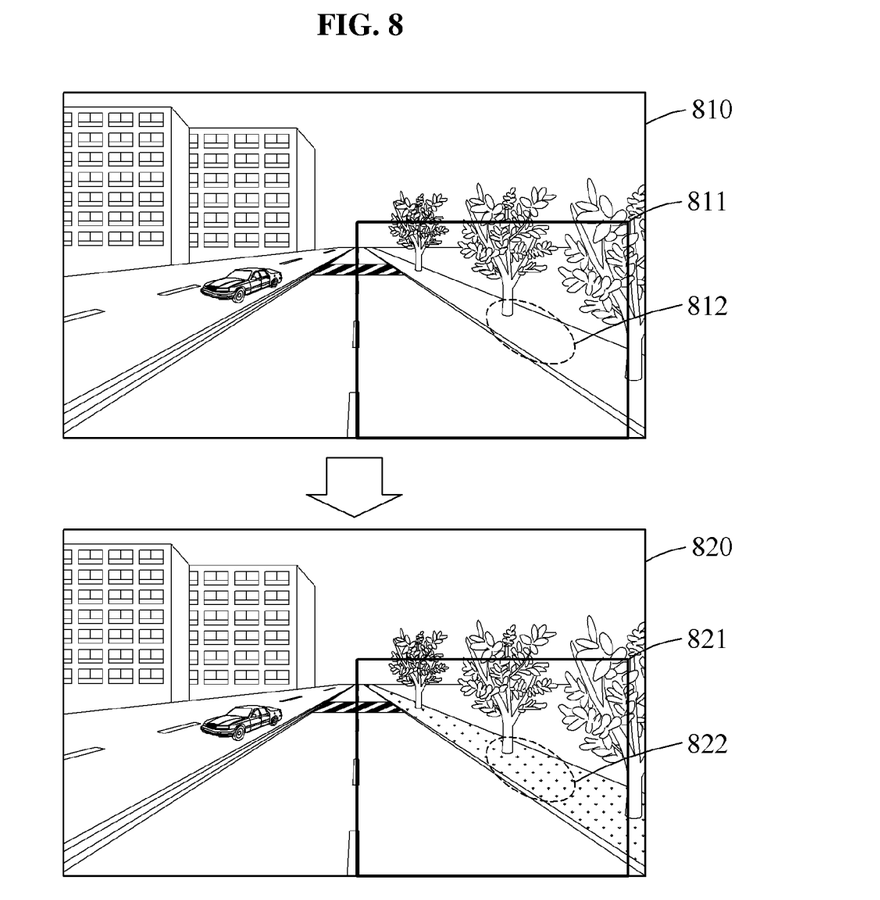
FIG. 8 illustrates an example of a recovered image.

FIG. 8 illustrates an example of a recovered image.

Referring to FIG. 8, details are lost due to a saturation of a pixel value in a partial area 812 of an image patch 811 in an input image 810. An image recovery apparatus performs a recovery operation of the image patch 811 as described above with reference to FIGS. 1 through 7. Thus, details are recovered in a partial area 822 of an image patch 821 in an output image 820.

For example, the image recovery apparatus corrects a luminance channel image based on a color channel image having a low correlation with the luminance channel image, to recover an image without an artifact such as shooting by a gradient with a high frequency characteristic. Thus, the image recovery apparatus effectively compensates for intermediate frequency information and high frequency information of a saturated area.

Figure 9:
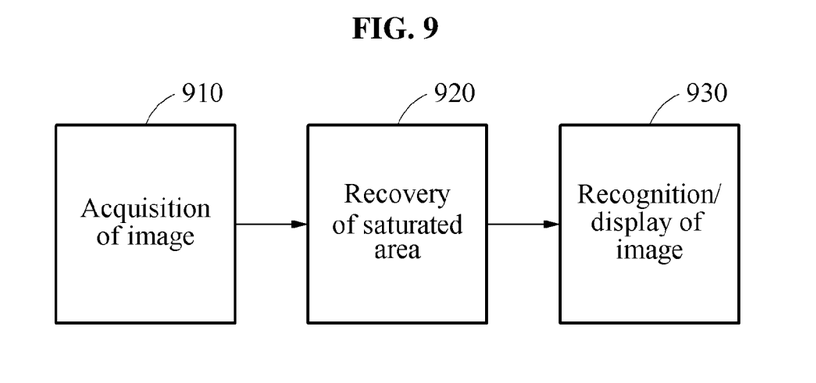
FIG. 9 illustrates an example of an image recovery apparatus.

FIG. 9 illustrates an example of an implementation of an image recovery apparatus.

The image recovery apparatus performs an acquisition 910 of an image, a recovery 920 of a saturated area, and a recognition/display 930 of an image.

For example, in the acquisition 910, the image recovery apparatus acquires a color image, and generates a conversion image from the color image. In the recovery 920, the image recovery apparatus recovers a saturated area of the color image by performing the recovery operation of FIGS. 1 through 7.

Also, the image recovery apparatus performs a recognition of an image based on an output image in which the saturated area is recovered. For example, the image recovery apparatus identifies or verifies an object appearing on the output image.

The image recovery apparatus displays the output image in which the saturated area is recovered. For example, the image recovery apparatus compresses pixel values of a luminance channel image to a maximum value (for example, "225") designated in a display, and displays the output image based on the compressed pixel values. The image recovery apparatus compresses each of pixels of the output image so that a pixel with a largest intensity value in the output image has the maximum value.

Figure 10:
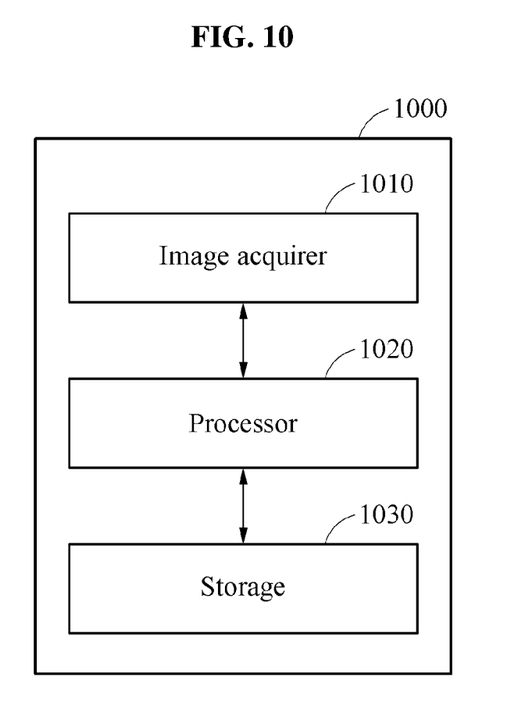
FIG. 10 is a diagram illustrating an example of an image recovery apparatus.

FIG. 10 is a diagram illustrating an example of a configuration of an image recovery apparatus 1000.

The image recovery apparatus 1000 includes an image acquirer 1010, a processor 1020, and a storage 1030.

The image acquirer 1010 acquires a color channel image. For example, the image acquirer 1010 includes an image sensor configured to capture an image in an RGB color space. However, the image acquirer 1010 is not limited thereto. The image acquirer 1010 also acquires a color channel image from an external device through a communication.

The processor 1020 generates a reference color image from a luminance channel image based on linear correlation information indicating a linear correlation between a color channel image and the luminance channel image, calculates residual information based on the reference color image and the color channel image, and corrects the luminance channel image based on the calculated residual information. However, an operation of the processor 1020 is not limited thereto, and the processor 1020 performs the operations described above with reference to FIGS. 1 through 7. Also, an order of the operations is not limited to that described with reference to FIGS. 1 through 7, and may be changed depending on a design.

The storage 1030 temporarily or semi-permanently stores information used to perform an image recovery method. For example, the storage 1030 stores images, an input image and an output image that are temporarily generated in the image recovery method.

For example, the image recovery apparatus 1000 is used in an image processing for a recognition and a black box of a camera system of a vehicle. Also, the image recovery method is applicable to postprocessing of an acquired image and preprocessing of a recognition process. Furthermore, the image recovery apparatus 1000 is used in an image processing for a recognition in a surveillance camera, and is applicable to a mobile phone and various cameras for an expansion of a dynamic range.

The image recovery apparatus 1000, image acquirer 1010, and other apparatuses, units, modules, devices, and other components described herein with respect to FIG. 10 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The method illustrated in FIG. 1 that performs the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the method of preventing the collision. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. Examples of a non-transitory computer-readable storage medium include read-only memory (ROM), random-access memory (RAM), CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An image recovery method comprising:
  acquiring an input image;
  determining an image patch comprising pixels corresponding to a partial area of the input image as a color channel image;
  generating a reference color image from a luminance channel image based on linear correlation information indicating a linear correlation between the color channel image and the luminance channel image;
  calculating residual information based on the reference color image and the color channel image; and
  correcting the luminance channel image based on the residual information.

2. The image recovery method of claim 1, wherein the determining of the color channel image further comprises selecting a blue channel image as the color channel image from the input image.

3. The image recovery method of claim 1, further comprising:
  compressing pixel values of the luminance channel image to a maximum value of a display.

4. An image recovery method comprising:
  generating a reference color Image from a luminance channel image based on linear correlation information indicating a linear correlation between a color channel image and the luminance channel image;
  calculating residual information based on the reference color image and the color channel image; and
  correcting the luminance channel image based on the residual information,
  wherein the generating of the reference color image comprises
  generating a target color image by filtering the color channel image based on a difference in position between pixels in the luminance channel image and a difference between pixel values of the pixels in the luminance channel image.

5. The image recovery method of claim 4, wherein the generating of the reference color image comprises:
  determining a first linear correlation coefficient based on a covariance between the color channel image and the luminance channel image and a variance of the luminance channel image;
  determining a second linear correlation coefficient based on the first linear correlation coefficient, an expected value of the color channel image, and an expected value of the luminance channel image; and
  generating the reference color image by applying the first linear correlation coefficient and the second linear correlation coefficient to the luminance channel image.

6. The image recovery method of claim 1, further comprising:
  calculating illuminance information based on a low frequency component of the luminance channel image.

7. The image recovery method of claim 6, wherein the correcting of the luminance channel image comprises correcting the luminance channel image based on the calculated illuminance information and the residual information.

8. The image recovery method of claim 6, wherein the calculating of the illuminance information comprises:
  generating a target luminance image by filtering the luminance channel image based on a difference in position between pixels in the luminance channel image and a difference between pixel values of the pixels in the luminance channel image; and
  determining the target luminance image as the illuminance information.

9. An image recovery method comprising:
  generating a reference color image from a luminance channel image based on linear correlation information indicating a linear correlation between the color channel image and the luminance channel image;
  calculating residual information based on removing an intensity value of a pixel in the reference color image that corresponds to a pixel in the color channel image from an intensity value of the pixel in the color channel image; and
  correcting the luminance channel image based on the residual information.

10. A non-transitory computer-readable storage medium storing instructions that, when executed by a processor, cause the processor to perform the image recovery method of claim 1.

11. An image recovery apparatus comprising:
an image acquirer configured to acquire a color channel image; and
a processor configured to
  generate a reference color image from a luminance channel image based on linear correlation information indicating a linear correlation between a color channel image and the luminance channel image,
  calculate illuminance information based on a low frequency component of the luminance channel image,
  calculate residual information based on the reference color image and the color channel image, and
  correct the luminance channel image based on the calculated illuminance information and the residual information.

12. The image recovery apparatus of claim 11, wherein the image acquirer is further configured to acquire an input image, and
the processor is further configured to determine the color channel image from the input image.

13. The image recovery apparatus of claim 12, wherein the processor is further configured to determine an image patch comprising pixels corresponding to a partial area of the input image as the color channel image.

14. The image recovery apparatus of claim 12, wherein the processor is further configured to select a blue channel image as the color channel image from the input image.

15. The image recovery apparatus of claim 11, wherein the processor is further configured to compress pixel values of the luminance channel image to a maximum value of a display.

16. The image recovery apparatus of claim 11, wherein the processor is further configured to generate a target color image by filtering the color channel image based on a difference in position between pixels in the luminance channel image and a difference between pixel values of the pixels in the luminance channel image.

17. The image recovery apparatus of claim 16, wherein the processor is further configured to:
  determine a first linear correlation coefficient based on a covariance between the color channel image and the luminance channel image and a variance of the luminance channel image;
  determine a second linear correlation coefficient based on the first linear correlation coefficient, an expected value of the color channel image and an expected value of the luminance channel image; and
  generate the reference color image by applying the first linear correlation coefficient and the second linear correlation coefficient to the luminance channel image.

* * * * *